United States Patent [19]

Yamamoto et al.

[11] Patent Number: 4,462,881

[45] Date of Patent: Jul. 31, 1984

[54] METHOD OF FORMING A MULTILAYER THIN FILM

[75] Inventors: Hiroshi Yamamoto, Tokyo; Noboru Shimizu, Tokorozawa; Masahide Suenaga, Odawara; Yukihisa Tsukada, Odawara; Tooru Takeura, Odawara, all of Japan

[73] Assignee: Hitachi, Ltd., Tokyo, Japan

[21] Appl. No.: 322,697

[22] Filed: Nov. 18, 1981

[30] Foreign Application Priority Data

Nov. 27, 1980 [JP] Japan ................. 55-168869

[51] Int. Cl.³ .................................... C23C 15/00
[52] U.S. Cl. .......................... 204/192 EC; 156/643;
156/656; 156/657; 156/659.1; 204/192 E;
427/89; 427/90; 427/91; 427/128; 427/131
[58] Field of Search ............... 204/192 E, 192 EC;
427/58, 88–91, 123, 128, 131, 132, 271, 272;
156/643, 655, 656, 657, 659.1

[56] References Cited

U.S. PATENT DOCUMENTS

| | | | |
|---|---|---|---|
| 3,791,952 | 2/1974 | Labuda et al. | 204/192 |
| 4,172,758 | 10/1979 | Bailey et al. | 156/643 |
| 4,184,933 | 1/1980 | Morcom et al. | 204/192 EC |

OTHER PUBLICATIONS

G. Almasi et al., Fabrication of Magnetic Bubble Domain Memories, IBM Technical Disclosure Bulletin, vol. 15, No. 6, Nov. 1972, pp. 1826–1827.

*Primary Examiner*—G. L. Kaplan
*Assistant Examiner*—W. T. Leader
*Attorney, Agent, or Firm*—Antonelli, Terry & Wands

[57] ABSTRACT

A method of forming a multilayer thin film is disclosed in which a second thin conductive film is deposited on a first thin conductive film uninterruptedly after the first thin film has been deposited on a substrate, the first and second films thus formed are processed so as to form a predetermined pattern, the surface of the second thin film is cleaned by ion etching and a third thin conductive film is deposited on the whole surface of the substrate, and then the second and third thin films are processed so as to have a pattern different from the above-mentioned predetermined pattern. In the case where two thin conductive films different in material and pattern from each other are piled on a substrate, the above method can form a perfect interconnection between the two films and can make very small the contact resistance between the two films. Accordingly, the method is fit to form, for example, a barber pole type magnetoresistive element.

19 Claims, 9 Drawing Figures

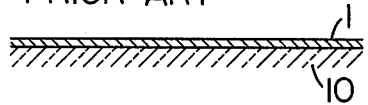
FIG. 1a
PRIOR ART
FIG. 1b
PRIOR ART
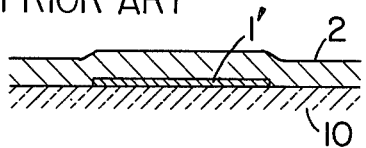
FIG. 1c
PRIOR ART
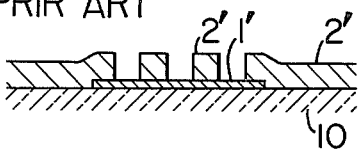
FIG. 1d
PRIR ART
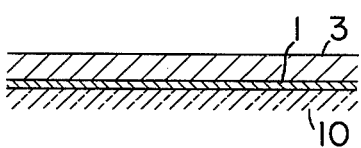
FIG. 2a
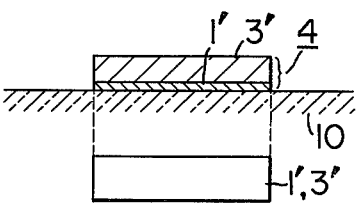
FIG. 2b
FIG. 2b'
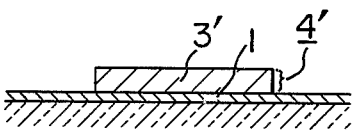
FIG. 2c
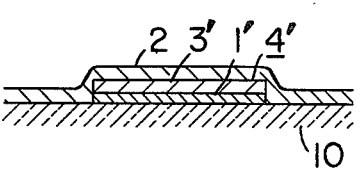
FIG. 2d
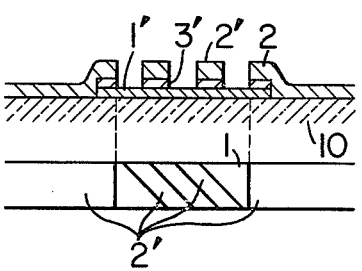

METHOD OF FORMING A MULTILAYER THIN FILM

BACKGROUND OF THE INVENTION

The present invention relates to a method of forming a multilayer thin film which includes a conductive film of a predetermined pattern formed on a substrate and another conductive film of a different predetermined pattern formed on the above-mentioned conductive film, and to a method of forming a multilayer thin film for use in a magnetoresistive element, and more particularly to a method of forming a multilayer thin film suitable for use in a barber pole type magnetoresistive element.

A conventional method of forming the above-mentioned multilayer thin films comprises the steps of: (i) forming a first thin conductive film 1 on a substrate 10, as shown in FIG. 1a of the accompanying drawings; (ii) processing the first thin conductive film 1 so as to form a thin conductive film 1' having a first predetermined pattern, as shown in FIG. 1b; (iii) depositing a second thin conductive film 2 which is made of a material different from the material of the thin film 1', on a surface of the substrate 10 which is provided with the thin film 1', as shown in FIG. 1c; and (iv) processing the second thin conductive film 2 so as to form a thin conductive film 2' having a second predetermined pattern, as shown in FIG. 1d. In the above-mentioned prior art, when the thin conductive film 1' is made of permalloy (namely, an Ni—Fe alloy) or the like to be used as a magnetoresistive film and the thin conductive film 2' is made of aluminum or the like to be used as a finely patterned electrode and a conductor, the element shown in FIG. 1d constitutes a barber pole type magnetoresistive element.

According to the above-mentioned conventional method, after the thin film 1' has been formed (as shown in FIG. 1b), the surface of the thin film 1' is usually cleaned by chemical etching, electrolytic etching, sputter etching, ion milling, or the like, and then the thin film 2 is formed on the thin film 1' and the exposed surface of the substrate. When the above-mentioned surface treatment is performed in the air, or when the thin film 1' is exposed to the air after the above-mentioned surface cleaning treatment, an oxide film may be formed on the surface of the thin film 1' and therefore metallic bonding (or interconnection) at an interface between the thin film 1' and the thin film 2 or 2' may become defective. Also, the bonding strength between the film 1' and the thin film 2 or 2' may be reduced, and the contact resistance at the interface may become high. That is, undesirable results may be produced.

In order to solve the above-mentioned problem, for example, the thin film 1' having the first predetermined pattern is first subjected to sputter cleaning in a vacuum vessel, and then the formation of the thin film 2 is carried out in the same vessel without exposing the cleaned thin film 1' to the air, so as to deposit the thin film 2 on the clean surface of the thin film 1' through the vacuum evaporation method. However, this method has the following drawbacks: (1) it is difficult to form a reproducible, clean surface by the present-day sputtering technique for a thin film having a thickness of hundreds of angstroms or less, and therefore sputtering is not suited for cleaning the surface of a very thin film; (2) residual nitrogen and oxygen molecules give an adverse effect to the surface of the thin film 1' when sputtering is performed; and (3) the sputter cleaning cannot be used in the case where the thin film 1' is readily damaged by sputtering, especially when this damage is a fatal one.

The following reference is cited to show the state of the art; a Japanese Patent Application Laid-open Specification (Laid-open No. 134624/1975).

SUMMARY OF THE INVENTION

An object of the present invention is to provide a method of forming a multilayer thin film which can solve all of the difficulties of the conventional methods.

Another object of the present invention is to provide a method of forming a two-layer thin film in which an excellent interconnection can be formed at the interface between a first conductive film having a predetermined pattern and a second conductive film having another predetermined pattern, which first and second conductive films form the two-layer thin film, the bonding strength between the first and second conductive films is increased as large as possible, and the contact resistance at the interface is lowered nearly equal to zero.

A further object of the present invention is to provide a method of forming a multilayer thin film for use in a barber pole type magnetoresistive element in which method the contact resistance between a magnetoresistive film and a finely patterned electrode film can be made very small.

In order to attain the above and other objects, according to the present invention, there is provided a method of forming a multilayer thin film which will be explained below with reference to FIGS. 2a to 2d.

That is, a thin conductive film 1 and an auxiliary thin conductive film 3 are formed on a substrate 10 in the order described above through sputtering or vacuum deposition techniques (as shown in FIG. 2a), without exposing the surface of the thin film 1 to the air. Accordingly, a perfect interconnection is formed at the interface between the thin films 1 and 3. Then, the substrate 10 provided with the thin films 1 and 3 is exposed to the ambient atmosphere and subjected to a patterning process, by which the composite layer of the films 1 and 3 or only the film 3 is patterned to form a shaped composite layer 4 comprising the thin films 1' and 3' each having a first predetermined pattern (see FIG. 2b) or a shaped thin film 4' comprising a shaped thin film 3' having a first predetermined pattern (see FIG. 2b'). Then, the substrate 10 is loaded in a sputtering or evaporation deposition apparatus provided with ion etching equipment and subjected to ion etching followed by sputtering or evaporation deposition without exposing the substrate to the ambient atmosphere between the steps. Here, in the case of the structure of FIG. 2b, the surfaces of the composite film 4 and the substrate 10 is cleaned by ion etching and a thin film 2 is successively formed, while in the case of structure of FIG. 2b', the film 2 is preferably formed after etching away the exposed thin film 1 to form a structure as shown in FIG. 2c. It is noted that etching and deposition steps are carried out successively in an evacuated atmosphere. Thus, the surface of the thin film 3' which might have been contaminated with the air, is cleaned by ion etching, and the thin film 2 is deposited directly on the cleaned surface of the thin film 3'. Therefore, the interconnection between the thin films 2 and 3' becomes faultless. Finally, the thin film 2 and the thin film 3' forming the upper layer of the thin film pattern 4 are processed so as to obtain a thin conductive film 2' having a second predetermined pattern. Thus, a multilayer thin film according to the present invention is formed (as shown in FIG. 2d). In the above method, it is necessary to use an etching technique which can etch the thin films 2 and 3 but does not etch the thin film 1.

BRIEF DESCRIPTION OF THE DRAWINGS

FIGS. 1a to 1d are sectional views for explaining a conventional method of forming a multilayer thin film.

FIGS. 2a to 2d show respective steps of a method of forming a multilayer thin film according to the present invention, in which FIGS. 2a and 2c are sectional views and each of FIGS. 2b and 2d includes sectional and plan views.

DESCRIPTION OF THE PREFERRED EMBODIMENT

Now, detailed explanation will be made on an embodiment of the present invention in which a magnetoresistive element is formed, with reference to FIGS. 2a to 2d.

A thin permalloy film 1 having a thickness of 200 to 500 Å is formed through vacuum deposition techniques on a nonmagnetic substrate 10 made of glass or the like, and then a thin aluminum film 3 having a thickness of about 1000 Å is formed directly on the permalloy film 1 by vacuum deposition (as shown in FIG. 2a). In this step, two evaporation sources (one for permalloy and the other for aluminum) are prepared in a vacuum evaporation device, and permalloy and aluminum are successively evaporated without exposing the substrate 10 to the air. Incidentally, the above-mentioned permalloy is an Ni—Fe alloy containing 20% iron by weight.

Next, the thin aluminum film 3 and the thin permalloy film 1 are selectively etched through photo-etching techniques to form a thin film pattern 4, which is made up of a thin aluminum film 3' and a thin permalloy film 1' (as shown in FIG. 2b) and is used to form a magnetoresistive sensor. In more detail, the thin aluminum film 3' is formed, for example, by chemically etching the thin film 3 in an etching solution containing 2% potassium ferricyanide $K_3Fe(CN)_6$, 6% sodium monohydrogen phosphate $Na_2HPO_4.12H_2O$, 1% potassium hydroxide KOH and the balance water, at a liquid temperature of 35° C. for 1 to 2 minutes using a photo-resist mask. The thin permalloy film 1' is formed by chemically etching the thin permalloy film 1 in an etching solution containing 1.5 to 2 g of iron trichloride $FeCl_3$, 4 to 4.5 g of hydrochloric acid HCl and 100 cc of water, at a liquid temperature of 20° C. for about 30 seconds using the thin aluminum film 3' as the mask. Alternatively, the thin permalloy film 1' can be formed by sputtering or dry etching.

Then, the substrate 10 is placed in a vacuum evaporation device provided with a sputter etching equipment. The surface of the thin aluminum film 3' which is the upper layer of the thin film pattern 4, is cleaned by dry etching such as argon sputter etching, and successively a thin aluminum film 2 is deposited thereon to a thickness of 2000 to 3000 Å (as shown in FIG. 2c), without exposing the cleaned surface of the film 3' to the air.

Alternatively, the aluminum thin film 3 may be processed by photoetching to form a thin film pattern 4' as shown in FIG. 2b'. Then, the substrate 10 may be loaded in a vacuum deposition apparatus with sputter etching equipment. First, the surface of the upper aluminum thin film 3' is cleaned by sputter etching while concurrently the exposed lower permalloy thin film 1 is etched away with the help of the aluminum film 3' serving as a mask. After the exposed portion of the permalloy film 1 has been removed, an aluminum thin film 2 is deposited successively without exposing the structure to the external atmosphere. The aluminum film 2 may be about 2000 to about 3000 Å thick.

Finally, the thin aluminum films 2 and 3' are selectively etched through well-known photoetching techniques to form a thin conductive film 2' having a second predetermined pattern. The thin film 2' is used as a conductor and a finely patterned electrode. Thus, a magnetic head having a thin magnetoresistive film is completed (as shown in FIG. 2d), in which the thin aluminum film 2' serving as the lead-out conductor and finely patterned electrode is formed on the thin permalloy film 1 acting as the magnetoresistive film. Here, the thin film 2' may be patterned by dipping the thin films 2 and 3' in the etching solution as used to form the thin film 3', at a liquid temperature of 35° C. for 3 to 5 minutes using a photoresist mask.

The above-mentioned magnetic head having the thin magnetoresistive film is called the barber pole type magnetic head, the details of which is disclosed in the previously-referred Japanese Patent Application Laid-open Specification (Laid-open No. 134624/1975). The finely patterned electrode formed on the thin film 1' (that is, the magnetoresistive film) is called a short bar, has a small width, and is arranged obliquely on the magnetoresistive film (as shown in the lower part of FIG. 2d). As the magnetic head is miniaturized, the width of the short bar is reduced to the order of 1 $\mu$m. When the width of the short bar is decreased to such a small value, the contact resistance between the thin film 1' acting as the magnetoresistive film and the short bar may be greatly increased, and therefore the short bar may not act as the electrode and characteristics peculiar to the barber pole type magnetic head may be lost. According to the previously-mentioned conventional method, the contact resistance was found to be not less than $10^{-5}$ $\Omega cm^2$. While, the contact resistance according to the present embodiment was found to be not greater than $10^{-7}$ $\Omega cm^2$, being smaller than that according to the conventional method by two orders of magnitude or more. The magnetoresistive head of the present embodiment showed such characteristic that can be obtained through the desired function of the short bar.

The thin films 2 and 3 may also be made of such as aluminum alloy as an Al—Si alloy, an Al—Cu alloy or an Al—Cu—Si alloy, molybdenum, tungsten, or others. Further, each of these films 2 and 3 may be formed of a two-layer film of chromium and gold, a two-layer film of molybdenum and gold, or a three-layer film of molybdenum, gold and molybdenum, or the like. Additionally, the thin films 2 and 3 may be made of the same conductive material as in the above embodiment, or may alternatively be made of different conductive materials. However, it is necessary that the thin films 2 and 3 can be etched by an etchant which does not etch the thin film 1.

A material for the first deposited thin film 1 may vary with the purpose and use of the multilayer thin film. For a magnetoresistive element, the thin film 1 is made of such ferromagnetic metals as an Ni—Fe alloy (called "permalloy"), or a semiconductive material such as silicon.

A material for the substrate 10 may also vary with the purpose and use of the multilayer thin film, but is an insulating material in many cases. For a magnetoresistive element, the substrate 10 is made of an insulating nonmagnetic material, for example, glass, $SiO_2$, $Al_2O_3$, other ceramics, or others. In some cases, the substrate 10 is made of a semiconductor material such as Si or GaAs.

A multilayer thin film forming method according to the present invention can be used not only in fabricating magnetoresistive elements such as the barber pole type magnetoresistive element, but also in forming various electrodes of semiconductor elements, for example, a Schottky electrode or a gate electrode of an MOS element. That is, the present invention can be used in various fields.

Obviously many modifications and variations of the present invention are possible in the light of the above teachings. It is therefore to be understood that within the scope of the appended claims the invention may be practiced in other ways than as specifically described above.

We claim:

1. A method of forming a multilayer thin film comprising the steps of:
   (i) forming on a predetermined substrate a first thin film made of a predetermined conductive or semiconductive material, and successively forming on said first thin film a second thin film made of a conductive material different from said predetermined conductive or semiconductive material;
   (ii) processing said first and second thin films to form a predetermined pattern;
   (iii) cleaning a surface of said second thin film by ion etching, and successively forming on the whole surface of said substrate a third thin film made of a conductive material which is different from said predetermined conductive or semiconductive material for forming said first thin film; and
   (iv) processing said second and third thin films so that said second and third thin films have a predetermined pattern different from said pattern of said first thin film.

2. A method according to claim 1, wherein said first thin film is formed of one of a magnetic conductive material and a semiconductor material.

3. A method according to claim 1 or 2, wherein each of said second and third films is a film selected from the group consisting of an aluminum film, an aluminum alloy film, a molybdenum film, a tungsten film, a two-layer film of chromium and gold, a two-layer film of molybdenum and gold, and a three-layer film of molybdenum, gold and molybdenum.

4. A method according to claim 1 or 2, wherein said first thin film and said second thin film are successively formed in an evacuated atmosphere.

5. A method according to claim 4, wherein said cleaning and said formation of the third film are carried out in an evacuated atmosphere.

6. A method according to claim 5, wherein said ion etching comprises argon ion sputtering.

7. A method according to claim 1, wherein during processing of said first and second thin films to form a predetermined pattern in step (ii), a part of the substrate is also exposed.

8. A method according to claim 7, wherein the first thin film is made of a conductive material which is magnetoresistive.

9. A method according to claim 1, wherein during said ion etching in step (iii), a part of the substrate is also exposed.

10. A method of forming a magnetoresistive element, comprising the steps of:
    (i) depositing a thin film of magnetoresistive material on a substrate in an evacuated atmosphere;
    (ii) successively depositing an auxiliary metal film on said magnetoresistive film in the evacuated atmosphere, without exposing the substrate to external atmosphere;
    (iii) processing portions of said magnetoresistive and auxiliary metal films to form a predetermined pattern; and
    (iv) cleaning the surface of the auxiliary metal film and successively depositing a main metal film on the whole surface of said substrate in an evacuated atmosphere.

11. A method according to claim 10, wherein said cleaning is carried out by argon ion sputtering.

12. A method according to claim 10, further comprising the step of patterning said auxiliary and main metal films by an etching process.

13. A method according to claim 12, wherein said auxiliary and main metal films are made of a same metal material.

14. A method according to claim 13, wherein said magnetoresistive material is permalloy and said metal material is aluminum.

15. A method according to claim 10, wherein during step (iii), said portions of said magnetoresistive and auxiliary metal films are selectively removed and during step (iv), a part of the substrate is exposed during cleaning the surface of said auxiliary metal film.

16. A method of forming a magnetoresistive element, comprising the steps of:
    (i) depositing a thin film of magnetoresistive material on a substrate in an evacuated atmosphere;
    (ii) successively depositing an auxiliary metal film on said magnetoresistive film in the evacuated atmosphere, without exposing the substrate to the external atmosphere;
    (iii) processing portions of said auxiliary metal film to form a predetermined pattern and to expose a part of said magnetoresistive film;
    (iv) cleaning the surface of the auxiliary metal film, and simultaneously etching the exposed part of said magnetoresistive metal film employing said auxiliary metal film as a mask; and
    (v) successively depositing a main metal film on the whole surface of said substrate in an evacuated atmosphere.

17. A method according to claim 16, further comprising the step of patterning said auxiliary and main metal films by an etching process.

18. A method according to claim 16, wherein during step (iii), said portions of said auxiliary metal film are selectively removed together with a part of said thin film of said magnetoresistive material.

19. A method according to claim 10 or claim 16, wherein subsequently said main metal film is selectively etched along with the auxiliary metal film.

* * * * *